(12) United States Patent
Zhu

(10) Patent No.: US 11,353,929 B2
(45) Date of Patent: Jun. 7, 2022

(54) DOUBLE-SIDE DISPLAY PANEL, BACKPLATE STRUCTURE OF SAME, AND METHOD OF MANUFACTURING SAME

(71) Applicant: WUHAN CHINA STAR OPTOELECTRONICS SEMICONDUCTOR DISPLAY TECHNOLOGY CO., LTD., Hubei (CN)

(72) Inventor: Cuilin Zhu, Wuhan (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 439 days.

(21) Appl. No.: 16/488,427

(22) PCT Filed: Apr. 12, 2019

(86) PCT No.: PCT/CN2019/082450
§ 371 (c)(1),
(2) Date: Aug. 23, 2019

(87) PCT Pub. No.: WO2020/155396
PCT Pub. Date: Aug. 6, 2020

(65) Prior Publication Data
US 2021/0356996 A1 Nov. 18, 2021

(30) Foreign Application Priority Data
Jan. 31, 2019 (CN) .......................... 201910099545.5

(51) Int. Cl.
*G06F 1/16* (2006.01)
*G06F 3/041* (2006.01)

(52) U.S. Cl.
CPC .......... *G06F 1/1658* (2013.01); *G06F 1/1652* (2013.01); *G06F 3/0412* (2013.01);
(Continued)

(58) Field of Classification Search
CPC .... G06F 1/1658; G06F 1/1652; G06F 3/0412; G06F 2203/04102; G06F 2203/04103
See application file for complete search history.

(56) References Cited

U.S. PATENT DOCUMENTS 10,212,811 B1 * 2/2019 Zhang ................. H01L 51/0097
10,516,119 B2 * 12/2019 Lee ...................... H01L 51/5256
(Continued)

FOREIGN PATENT DOCUMENTS

CN 204595396 U 8/2015
CN 105223719 A 1/2016
(Continued)

*Primary Examiner* — Rockshana D Chowdhury
(74) *Attorney, Agent, or Firm* — Benesch, Friedlander, Coplan & Aronoff LLP

(57) ABSTRACT

A double-side display panel, a backplate structure of the same, and a method of manufacturing the same are provided. The backplate structure of double-side display panel includes a first backplate, a stiffener, and a second backplate. The first backplate is fixed on one surface of the stiffener. The second backplate is fixed on another surface of the stiffener. An edge of the first backplate, an edge of the stiffener, and an edge of the second backplate are aligned with each other.

14 Claims, 4 Drawing Sheets

(52) U.S. Cl.
CPC .............. *G06F 2203/04102* (2013.01); *G06F 2203/04103* (2013.01)

(56) References Cited

U.S. PATENT DOCUMENTS

| | | | |
|---|---|---|---|
| 10,777,101 B2* | 9/2020 | Park | .................... H01L 27/3211 |
| 10,871,802 B2* | 12/2020 | Yug | ........................ B32B 27/08 |
| 10,916,735 B2* | 2/2021 | Kwon | ................. H01L 51/5092 |
| 2007/0019393 A1 | 1/2007 | Tsai | |
| 2019/0346887 A1* | 11/2019 | Park | ...................... G06F 1/1652 |

FOREIGN PATENT DOCUMENTS

| | | | |
|---|---|---|---|
| CN | 105932036 A | 9/2016 | |
| CN | 106125442 A | 11/2016 | |
| JP | 6294451 B2 | 3/2018 | |

\* cited by examiner

DOUBLE-SIDE DISPLAY PANEL, BACKPLATE STRUCTURE OF SAME, AND METHOD OF MANUFACTURING SAME

CROSS REFERENCE TO RELATED APPLICATION

This application claims the priority of International Application No. PCT/CN2019/082450, filed on 2019 Apr. 12, which claims priority to Chinese Application No. 201910099545.5 filed on 2019 Jan. 31. The entire disclosures of each of the above applications are incorporated herein by reference.

FIELD OF INVENTION

The present disclosure relates to display technologies, and more particularly, to a double-side display panel, a backplate structure of the same, and a method of manufacturing the same.

BACKGROUND OF INVENTION

In modern communication industry, markets for mobile phones, televisions, tablets, notebooks, digital cameras and other products is growing. Various foldable display devices are also being developed. In manufacturing a flexible full-screen display module, it is necessary to use a bending process, as shown in FIG. 1. Referring to FIG. 2, production technologies are limited by accuracy of the process, and misalignment d between two backplates is prone to occur. After bending, there is a poor arc shape (pointed by a hollow arrow in the figure), and an accuracy of radius R is unstable. Product quality is reduced as shown on the right side of FIG. 2.

Therefore, there is a need for a double-side display panel, a backplate structure of the same, and a method of manufacturing the same to solve the above problems.

SUMMARY OF INVENTION

In view of the above, the present disclosure provides a double-side display panel, a backplate structure of the same, and a method of manufacturing the same to resolve above-mentioned technical problem.

In order to achieve above-mentioned object of the present disclosure, one embodiment of the disclosure provides a backplate structure of double-side display panel including a first backplate, a stiffener, and a second backplate. The first backplate is fixed on one surface of the stiffener, the second backplate is fixed on another surface of the stiffener; and an edge of the first backplate, an edge of the stiffener, and an edge of the second backplate are aligned with each other.

In one embodiment of the disclosure, the second backplate and the stiffener are integrated into one piece.

In one embodiment of the disclosure, the backplate structure further includes a heat dissipating material disposed between the first backplate and the stiffener.

In one embodiment of the disclosure, an edge of the heat dissipating material, the edge of the first backplate, the edge of the stiffener, and the edge of the second backplate are aligned with each other.

In one embodiment of the disclosure, the heat dissipating material includes a copper/graphite foam composite material.

In one embodiment of the disclosure, material of the stiffener includes polyethylene terephthalate, or cyclic olefin polymer.

Furthermore, another embodiment of the disclosure provides a double-side display panel including a first display panel, a second display panel, a flexible circuit board, and a backplate structure. The flexible circuit board is electrically connected to the first display panel and the second display panel. The backplate structure includes a first backplate, a stiffener, and a second backplate. The first backplate is fixed on one surface of the stiffener. The second backplate is fixed on another surface of the stiffener. The first display panel is fixed on a surface of the first backplate opposite to another surface of the first backplate facing the stiffener. The second display panel is fixed on a surface of the second backplate opposite to another surface of the second backplate facing the stiffener. An edge of the first backplate, an edge of the stiffener, and an edge of the second backplate are aligned with each other.

In one embodiment of the disclosure, the double-side display panel further includes a heat dissipating material disposed between the first backplate and the stiffener.

In one embodiment of the disclosure of the double-side display panel, an edge of the heat dissipating material, the edge of the first backplate, the edge of the stiffener, and the edge of the second backplate are aligned with each other.

In one embodiment of the disclosure of the double-side display panel, material of the heat dissipating material includes a copper/graphite foam composite material.

In one embodiment of the disclosure of the double-side display panel, material of the stiffener includes polyethylene terephthalate, or cyclic olefin polymer.

In one embodiment of the disclosure of the double-side display panel, an edge of the first display panel and an edge of the second display panel are aligned with each other.

In one embodiment of the disclosure of the double-side display panel, the second backplate and the stiffener are integrated into one piece.

In one embodiment of the disclosure, the double-side display panel further includes a touch panel, a flexible circuit board of the touch panel, a polarizer, and a glass cover.

Furthermore, another embodiment of the disclosure provides a manufacturing method of a double side display panel, including steps of: providing a backplate structure; providing a first display panel, a second display panel, and a flexible circuit board electrically connected to the first display panel and the second display panel; fixing the first display panel on one surface of the backplate structure; and fixing the second display panel on another surface of the backplate structure. The backplate structure includes a first backplate, a stiffener, and a second backplate. The first backplate is fixed on one surface of the stiffener. The second backplate is fixed on another surface of the stiffener. An edge of the first backplate, an edge of the stiffener, and an edge of the second backplate are aligned with each other.

In one embodiment of the disclosure, the step of providing a backplate structure includes steps of: providing a first backplate; providing a stiffener; fixing the first backplate on one surface of the stiffener; providing a second backplate; and fixing the second backplate on another surface of the stiffener. An edge of the first backplate, an edge of the stiffener, and an edge of the second backplate are aligned with each other.

In comparison with prior art, the double-side display panel, a backplate structure of the same, and a method of manufacturing the same of the disclosure ensure an alignment and parallel of two backplates, avoid mismatching of the two backplates, provide a better arc shape, enhance accuracy of radius R, and enhance reliability of products. The disclosure resolves technical problems that a misalignment d between the two backplates is prone to occur, there is a poor arc shape after bending, and an accuracy of radius R is unstable by aligning an edge of the first backplate, an edge of the stiffener, and an edge of the second backplate.

DETAILED DESCRIPTION OF PREFERRED EMBODIMENTS

The following description of the embodiments is provided by reference to the following drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Figure 1:
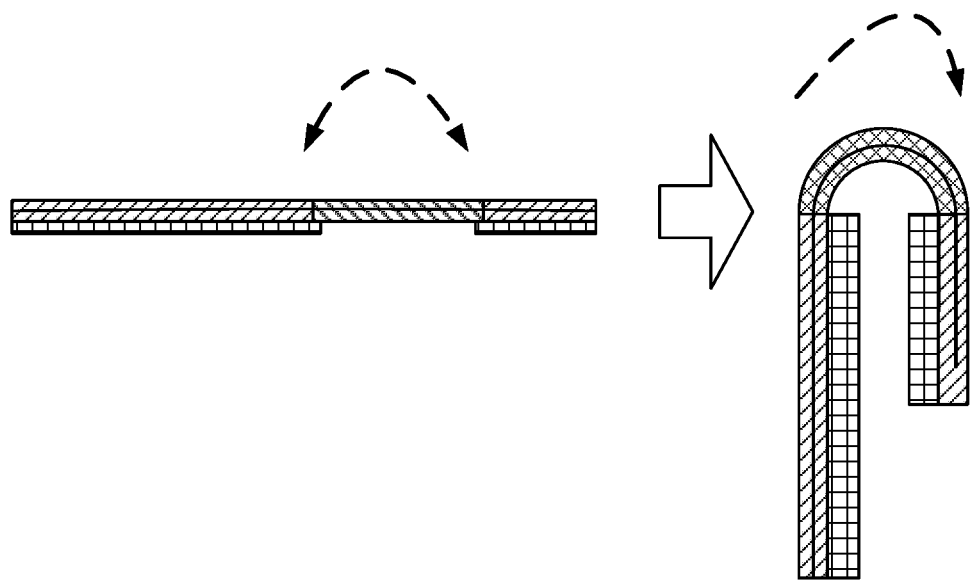
FIG. 1 is a schematic view of a bending structure of a backplate structure of a double-side display panel according to prior art.
Figure 2:
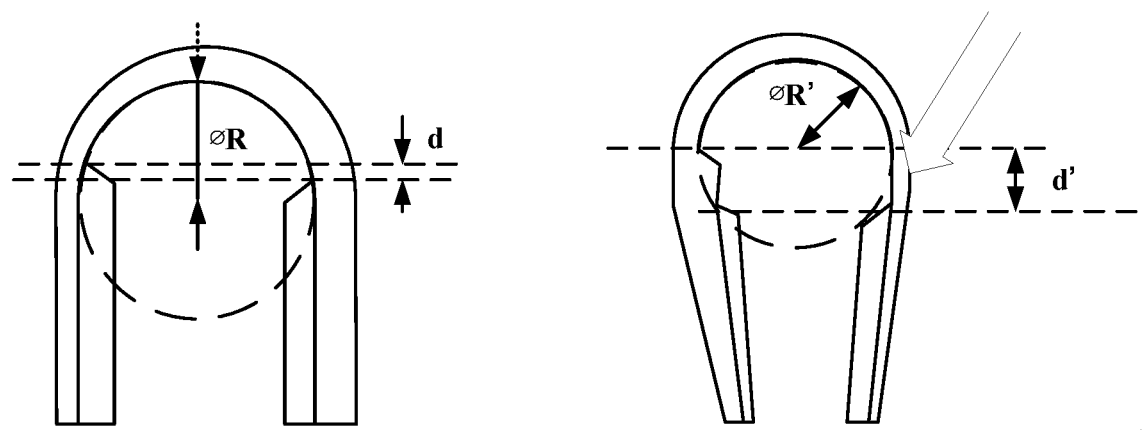
FIG. 2 is a schematic view of a bending structure of a backplate structure of a double-side display panel according to prior art.
Figure 3:
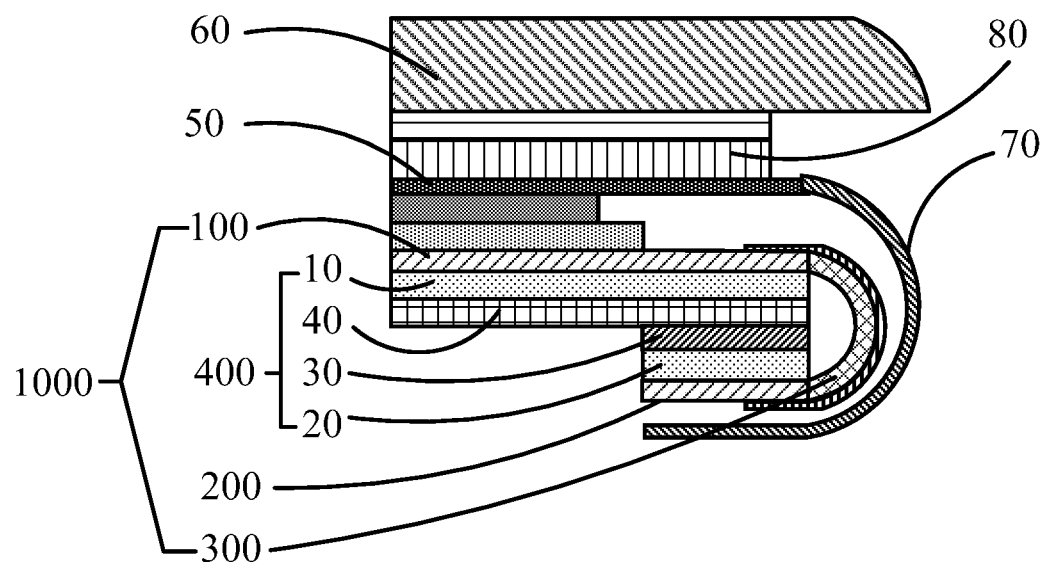
FIG. 3 is a schematic view of a structure of a double-side display panel and a backplate structure thereof according to an embodiment of the present disclosure.

Referring to FIG. 3, FIG. 3 is a schematic view of a structure of a double-side display panel and a backplate structure thereof according to an embodiment of the present disclosure.

One embodiment of the disclosure provides a backplate structure 400 of double-side display panel including a first backplate 10, a stiffener 30, and a second backplate 20. The first backplate 10 is fixed on one surface of the stiffener 30, the second backplate 20 is fixed on another surface of the stiffener 30; and an edge of the first backplate 10, an edge of the stiffener 30, and an edge of the second backplate 20 are aligned with each other.

In detail, material of the stiffener 30 includes but not limit to polyethylene terephthalate (PET), or cyclic olefin polymer (COP).

In one embodiment of the disclosure, the backplate structure 400 further includes a heat dissipating material 40 disposed between the first backplate 10 and the stiffener 30.

In one embodiment of the disclosure, the heat dissipating material 40 includes a copper/graphite foam composite material.

In one embodiment of the disclosure, an edge of the heat dissipating material 40, the edge of the first backplate 10, the edge of the stiffener 30, and the edge of the second backplate 20 are aligned with each other.

In one embodiment of the disclosure, the second backplate 20 and the stiffener 30 are integrated into one piece.

Furthermore, another embodiment of the disclosure provides a double-side display panel 1000 including a first display panel 100, a second display panel 200, a flexible circuit board 300, and a backplate structure 400. The flexible circuit board 300 is electrically connected to the first display panel 100 and the second display panel 200. The backplate structure 400 includes a first backplate 10, a stiffener 30, and a second backplate 20. The first backplate 10 is fixed on one surface of the stiffener 30. The second backplate 20 is fixed on another surface of the stiffener 30. The first display panel 100 is fixed on a surface of the first backplate 10 opposite to another surface of the first backplate 10 facing the stiffener 30. The second display panel 200 is fixed on a surface of the second backplate 20 opposite to another surface of the second backplate 20 facing the stiffener 30. An edge of the first backplate 10, an edge of the stiffener 30, and an edge of the second backplate 20 are aligned with each other.

In one embodiment of the disclosure of the double-side display panel 1000, material of the stiffener 30 includes PET, or COP.

In one embodiment of the disclosure, the double-side display panel 1000 further includes a heat dissipating material 40 disposed between the first backplate 10 and the stiffener 30.

In one embodiment of the disclosure of the double-side display panel 1000, material of the heat dissipating material 40 includes a copper/graphite foam composite material.

In one embodiment of the disclosure of the double-side display panel 1000, an edge of the heat dissipating material 40, the edge of the first backplate 10, the edge of the stiffener 30, and the edge of the second backplate 20 are aligned with each other.

In one embodiment of the disclosure of the double-side display panel 1000, an edge of the first display panel 100 and an edge of the second display panel 200 are aligned with each other.

In one embodiment of the disclosure, the double-side display panel 1000 further includes a touch panel 50, a flexible circuit board 70 of the touch panel 50, a polarizer 80; and a glass cover 60.

Figure 5:
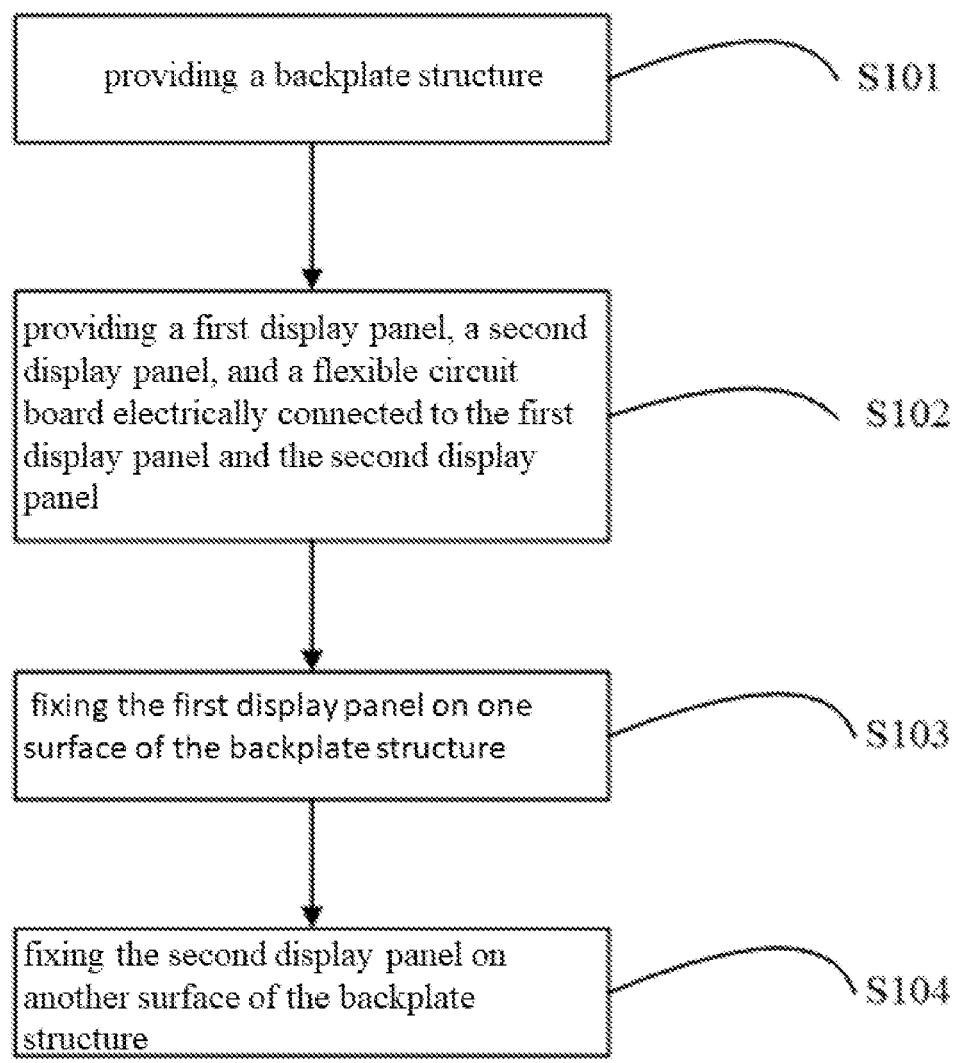
FIG. 5 is a schematic flowchart of manufacturing method of a double-side display panel according to an embodiment of the present disclosure.

Referring to FIG. 5, furthermore, another embodiment of the disclosure provides a manufacturing method of a double side display panel, including steps of step S101: providing a backplate structure; step S102: providing a first display panel, a second display panel, and a flexible circuit board electrically connected to the first display panel and the second display panel; step S103: fixing the first display panel on one surface of the backplate structure; and step S104: fixing the second display panel on another surface of the backplate structure.

Figure 6:
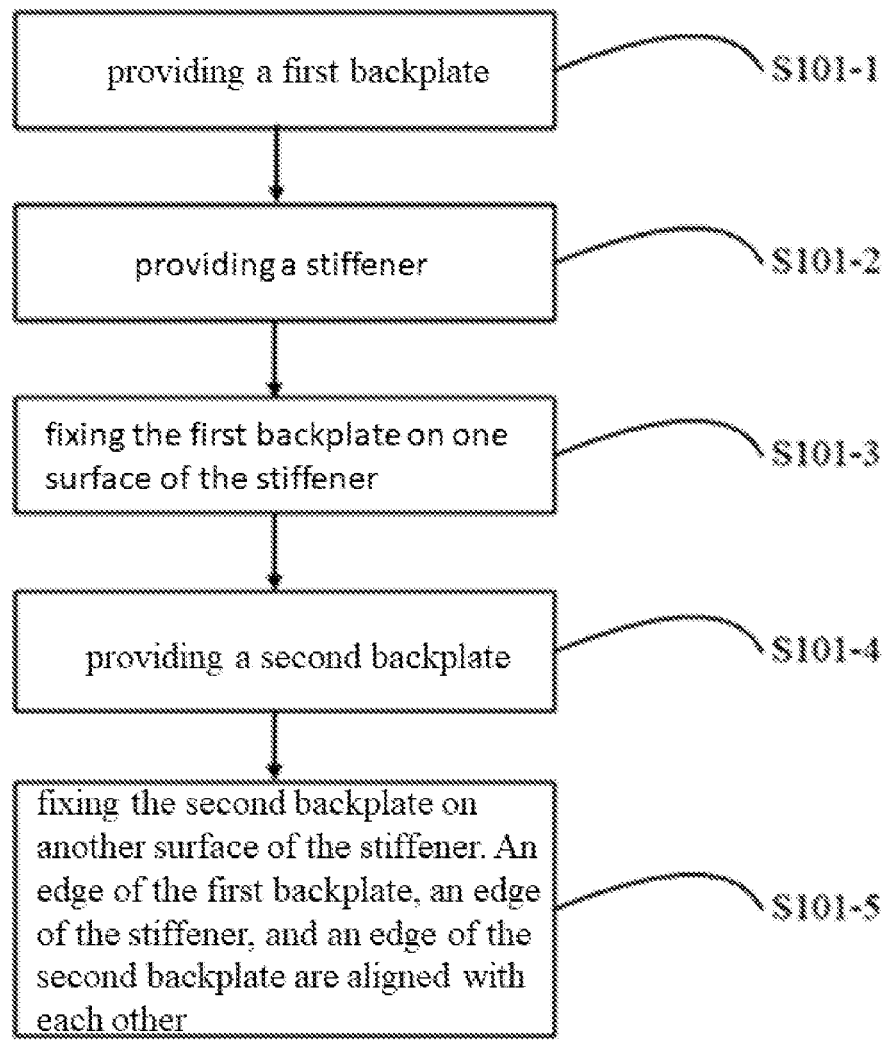
FIG. 6 is a schematic flowchart of manufacturing method of backplate structure of a double-side display panel according to an embodiment of the present disclosure.

Referring to FIGS. 5 and 6, in one embodiment of the disclosure, the step S101: providing a backplate structure includes steps of step S101-1: providing a first backplate; step S101-2: providing a stiffener; step S101-3: fixing the first backplate on one surface of the stiffener; step S101-4: providing a second backplate; and step S101-5: fixing the second backplate on another surface of the stiffener. An edge of the first backplate, an edge of the stiffener, and an edge of the second backplate are aligned with each other.

Figure 4:
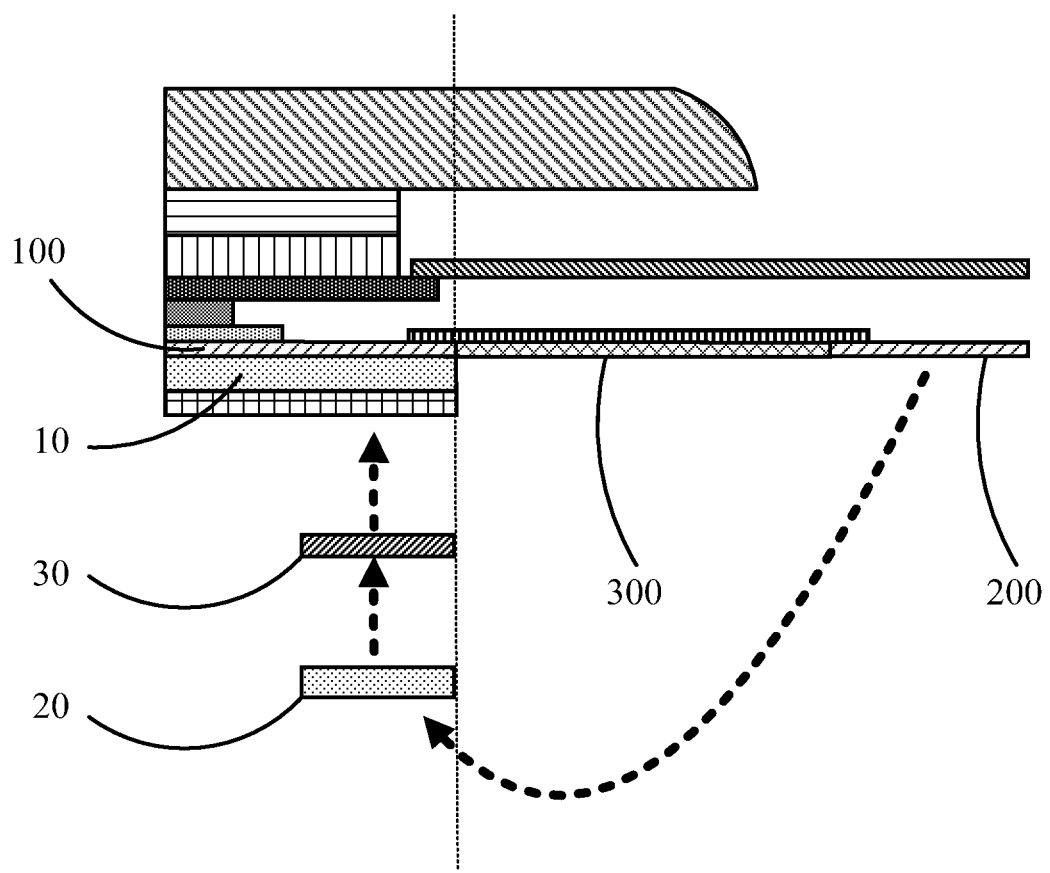
FIG. 4 is a schematic view of manufacturing process of a double-side display panel and a backplate structure thereof according to an embodiment of the present disclosure.

Referring to FIGS. 3 and 4, in detail, a process that attach and align the stiffener 30 with the edge of the first backplate 10 is easy and well controlled in accuracy. A process that attach and align the second backplate 20 with the edge of the stiffener 30 is easy and well controlled in accuracy. In the above process, the flexible circuit board 300 between the first display panel 100 and the second display panel 200 will not interfere with an accuracy of the attaching action, because the second display panel 200 is not yet attached to the second backplate 20. After the backplate structure 400 is assembled, the second display panel 200 is then attached to the backplate structure 400 and aligned with the first display panel 100.

Referring to FIG. 3, in one embodiment of manufacturing method of the double side display panel of the disclosure, step S103 that fixing the first display panel on one surface of the backplate structure is fixing the first display panel 100 on a surface of the first backplate 10 of the backplate structure 400.

In detail, the double-side display panel 1000 further includes a heat dissipating material 40 disposed between the first backplate 10 and the stiffener 30.

In one embodiment of manufacturing method of the double side display panel of the disclosure, step S104 that fixing the second display panel on another surface of the backplate structure is fixing the second display panel 200 on a surface of the second backplate 20 of the backplate structure 400.

In comparison with prior art, the double-side display panel, a backplate structure of the same, and a method of manufacturing the same of the disclosure ensure an alignment and parallel of two backplates, avoid mismatching of the two backplates, provide a better arc shape, enhance accuracy of radius R, and enhance reliability of products. The disclosure resolves technical problems that a misalignment d between the two backplates is prone to occur, there is a poor arc shape after bending, and an accuracy of radius R is unstable by aligning an edge of the first backplate, an edge of the stiffener, and an edge of the second backplate.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A backplate structure of a double-side display panel comprising a first display panel and a second display panel apart from the first display panel, wherein the backplate structure comprises:
   a first backplate comprising a plane surface configured to support the first display panel;
   a stiffener different from the first backplate; and
   a second backplate apart from the first backplate and comprising a plane surface configured to support the second display panel, wherein the first backplate and the second backplate are not directly attached to each other, the first backplate is attached on one surface of the stiffener, the second backplate is attached on another surface of the stiffener, and an edge of the first backplate, an edge of the stiffener, and an edge of the second backplate are aligned with each other.

2. The backplate structure of the double-side display panel according to claim 1, further comprising a heat dissipating material disposed between the first backplate and the stiffener.

3. The backplate structure of the double-side display panel according to claim 2, wherein an edge of the heat dissipating material, the edge of the first backplate, the edge of the stiffener, and the edge of the second backplate are aligned with each other.

4. The backplate structure of the double-side display panel according to claim 2, wherein the heat dissipating material comprises a copper/graphite foam composite material.

5. The backplate structure of the double-side display panel according to claim 1, wherein material of the stiffener comprises polyethylene terephthalate, or cyclic olefin polymer.

6. A double-side display panel comprising:
   a first display panel;
   a second display panel apart from the first display panel;
   a flexible circuit board electrically connected between the first display panel and the second display panel; and
   a backplate structure, wherein the backplate structure comprises:
   a first backplate comprising a plane surface configured to support the first display panel;
   a stiffener different from the first backplate; and
   a second backplate apart from the first backplate and comprising a plane surface configured to support the second display panel, wherein the first backplate and the second backplate are not directly attached to each other, the first backplate is attached on one surface of the stiffener, the second backplate is attached on another surface of the stiffener, the first display panel is attached on the plane surface of the first backplate opposite to another surface of the first backplate facing the stiffener, the second display panel is attached on the plane surface of the second backplate opposite to another surface of the second backplate facing the stiffener, and an edge of the first backplate, an edge of the stiffener, and an edge of the second backplate are aligned with each other.

7. The double-side display panel according to claim 6, further comprising a heat dissipating material disposed between the first backplate and the stiffener.

8. The double-side display panel according to claim 7, wherein an edge of the heat dissipating material, the edge of the first backplate, the edge of the stiffener, and the edge of the second backplate are aligned with each other.

9. The double-side display panel according to claim 8, wherein material of the heat dissipating material comprises a copper/graphite foam composite material.

10. The double-side display panel according to claim 6, wherein material of the stiffener comprises polyethylene terephthalate, or cyclic olefin polymer.

11. The double-side display panel according to claim 6, wherein an edge of the first display panel and an edge of the second display panel are aligned with each other.

12. The double-side display panel according to claim 6, further comprising:
   a touch panel;
   a flexible circuit board of the touch panel;
   a polarizer; and
   a glass cover.

13. A manufacturing method of a double side display panel, comprising:
   providing a backplate structure;
   providing a first display panel, a second display panel apart from the first display panel, and a flexible circuit board electrically connected between the first display panel and the second display panel;
   attaching the first display panel on one surface of the backplate structure; and
   attaching the second display panel on another surface of the backplate structure, wherein the second display panel is aligned with the first display panel, and the backplate structure comprises:

a first backplate comprising a plane surface configured to support the first display panel;
a stiffener different from the first backplate; and
a second backplate apart from the first backplate and comprising a plane surface configured to support the second display panel, wherein the first backplate is attached on one surface of the stiffener, the second backplate is attached on another surface of the stiffener, and an edge of the first backplate, an edge of the stiffener, and an edge of the second backplate are aligned with each other.

14. The manufacturing method of the double side display panel according to claim 13, wherein the step of providing a backplate structure comprises steps of:
providing the first backplate;
providing the stiffener;
attaching the first backplate on one surface of the stiffener;
providing the second backplate; and
attaching the second backplate on another surface of the stiffener.

\* \* \* \* \*